(12) United States Patent
Kaishio

(10) Patent No.: US 7,293,549 B2
(45) Date of Patent: Nov. 13, 2007

(54) SEALING MECHANISM FOR TUBULAR BODY

(75) Inventor: Mitsuo Kaishio, Koga (JP)

(73) Assignee: Sanoh Industrial Co., Ltd., Koga-shi, Ibaraki-ken (JP)

( * ) Notice: Subject to any disclaimer, the term of this patent is extended or adjusted under 35 U.S.C. 154(b) by 110 days.

(21) Appl. No.: 11/342,808

(22) Filed: Jan. 31, 2006

(65) Prior Publication Data

US 2006/0180125 A1    Aug. 17, 2006

(30) Foreign Application Priority Data

Feb. 14, 2005    (JP) ............... 2005-035416

(51) Int. Cl.
*F02M 55/02*    (2006.01)

(52) U.S. Cl. .................. 123/469; 123/456; 29/235

(58) Field of Classification Search ............... 123/468, 123/469, 470, 456
See application file for complete search history.

(56) References Cited

U.S. PATENT DOCUMENTS

| | | | | |
|---|---|---|---|---|
| 2,382,359 A | * | 8/1945 | Weightman | 29/282 |
| 3,158,923 A | * | 12/1964 | Reinsma | 29/898.11 |
| 3,834,543 A | * | 9/1974 | Dreves | 210/232 |
| 4,291,451 A | * | 9/1981 | O'Neill et al. | 29/235 |
| 4,325,172 A | * | 4/1982 | Holdaway | 29/235 |
| 4,515,376 A | * | 5/1985 | Okamuro | 29/451 |
| 4,907,811 A | * | 3/1990 | Nash et al. | 277/551 |
| 5,392,505 A | * | 2/1995 | Harada | 29/450 |
| 5,582,074 A | * | 12/1996 | Kelley et al. | 74/502.4 |
| 5,956,830 A | * | 9/1999 | Imbus et al. | 29/235 |
| 6,062,200 A | * | 5/2000 | Hofmeister | 123/470 |
| 6,102,007 A | * | 8/2000 | Furst | 123/469 |
| 6,397,446 B1 | * | 6/2002 | Whetstone | 29/235 |
| 6,640,784 B1 | * | 11/2003 | Sims, Jr. | 123/470 |
| 6,694,591 B2 | * | 2/2004 | Rullmann et al. | 29/450 |
| 6,807,945 B2 | * | 10/2004 | Reiter et al. | 123/470 |

* cited by examiner

*Primary Examiner*—Thomas Moulis
(74) *Attorney, Agent, or Firm*—Posz Law Group, PLC; R. Eugene Varndell, Jr.

(57) ABSTRACT

A tubular body sealing mechanism which can easily make a hermetic seal. A bushing is fit onto the leading end of a shaft part of the hermetic plug to be moveable in the axial direction, the ring seal member is fit to be moveable between a base part and the bushing, a small diameter region is formed on the end of the shaft part on the bushing side in the ring seal member moveable region, a large diameter region is formed on the end of the shaft part on the base part side, and when the shaft part of a hermetic plug is inserted into the injector cap from the opening end, the bushing contacts the reduced diameter region of the injector cap, the bushing moves toward the base part of the shaft part, and the ring seal member is moved by the bushing from the small diameter region to the large diameter region, such that the ring seal member deforms and expands toward the inner peripheral face of the injector cap and the ring seal member forms a press fit to the inner peripheral face of the injector cap to create a hermetic seal.

6 Claims, 5 Drawing Sheets

SEALING MECHANISM FOR TUBULAR BODY

BACKGROUND OF THE INVENTION

1. Field of the Invention

The present invention relates to a sealing mechanism for a tubular body.

2. Description of the Related Art

Brazen pipes or the like are hermetic seal tested. These hermetic seal tests verify the hermeticity of the pipe by blocking all of the openings of the pipe with hermetic plugs, injecting air at a predetermined pressure into the pipe, and then measuring the pressure after a predetermined period of time using a pressure gauge.

The hermetic plugs used for these hermeticity tests may for instance be made by retaining a cylindrical rubber body between end plates, passing a shaft member with a hole in the center through the center of the end plates and the rubber body, securing the leading end of the shaft member to one end plate, fitting the shaft member into a pipe, causing the other end plate to contact the leading end of the pipe, and screwing a nut to the shaft member positioned at the back end of the pipe. To illustrate, refer to Japanese Patent Application Laid-Open No. 2002-171654 (FIG. 3 and FIG. 4).

With the hermetic plug of this referenced patent application (Japanese Patent Application Laid-Open No. 2002-171654), the rubber body is inserted to the inside of the pipe from the open end, and both ends are moved towards each other inside the pipe by tightening the nut, and thereby the rubber body will expand outward in the radial direction, creating a press fit between the rubber body and the inside surface of the pipe in order to seal the opening of the pipe.

Note, compressed air is injected into the pipe through the hole in the shaft member.

However, when a pipe opening is sealed with a hermetic plug according to the referenced patent application and then the hermetic plug is to removed, the nut must be loosened each time and this operation is complex.

SUMMARY OF THE INVENTION

In light of the foregoing, an object of the present invention is to provide a sealing mechanism for a tubular body which can seal with a simple operation.

In order to accomplish the aforementioned object, the tubular body sealing mechanism of claim 1 is a tubular body sealing mechanism which seals, with a ring seal member that fits onto a shaft part of an attaching member, a space between an opening of the tubular body which has a reduced diameter region at a suitable distance from the opening and the attaching member which is inserted into the opening, wherein a bushing is fit onto the leading end of the shaft part to be moveable in the axial direction, the ring seal member is fit to be moveable between a base part thereof and the bushing, a small diameter region is formed on the end of the shaft part on the bushing side in the ring seal member moveable region, a large diameter region is formed on the end of the shaft part on the base part side, and when the shaft part of the attaching member is inserted into the tubular body from the opening end of the tubular body, the bushing contacts the reduced diameter region of the tubular body, the bushing moves toward the base part of the shaft, and the ring seal member is moved by the bushing from the small diameter region to the large diameter region, such that the ring seal member deforms and expands toward the inner peripheral face of the opening and the ring seal member forms a press fit to the inner peripheral face of the tubular body to create a hermetic seal.

The reduced diameter region of the tubular body where the seal mechanism is applied is for stopping the bushing, and is not necessary round. In other words, any protruding region which stops the bushing may be formed inside the tubular body. Furthermore, one end of the bushing contacts the reduced diameter region while the other end presses the ring seal material, and therefore the surface which contacts with the ring seal member is preferably a continuous round shape so as to contact the ring seal member across the whole surface. Furthermore, the cross-sectional shape of the ring seal member is preferably round, but a rectangular shape is also acceptable.

Furthermore, the tubular body sealing mechanism of claim 2 is the invention according to claim 1, wherein the shape and dimensions of the inner peripheral face of the tubular body, the large diameter region of the shaft part, and the ring seal member are designed such that the frictional resistance between the ring seal member and the inner peripheral face of the tubular body is larger than the frictional resistance between the ring seal member and the large diameter region of the shaft part, when the ring seal member is positioned at the large diameter region of the shaft part.

Furthermore, the tubular body sealing mechanism of claim 3 is the invention according to claim 1, wherein the small diameter region and the large diameter region of the shaft part are connected by a tapered surface.

This tapered surface is not necessarily strictly a tapered surface, and may be formed by a surface which gradually curves towards the outside from the small diameter region to the large diameter region.

Furthermore, the tubular body sealing mechanism of claim 4 is the invention according to claim 1, wherein a hole is formed to penetrate through the axial core of the attaching member.

Furthermore, the tubular body sealing mechanism of claim 5 is the invention according to claim 1, wherein the tubular body is an injector cap for a fuel delivery pipe, and the attaching member is a hermetic plug used for a hermetic seal test.

Furthermore, the tubular body sealing mechanism of claim 6 is the invention according to claim 1, wherein the tubular body is an injector cap for a fuel delivery pipe, and the attaching member is an injector.

With the tubular body sealing mechanism corresponding to the present invention according to claim 1, a seal can be formed simply by pressing the attaching member into the opening of the tubular body, so the operation is simple.

Furthermore, with the ring seal member positioned at the small diameter region of the shaft part, the ring seal member will be pressed in the axial direction. Therefore, the operation of inserting the attaching member is simplified because the attaching member will not contact the inside surface of the opening of the tubular body and even if contacted, will only contact with a weak force, so the attaching member can be inserted into the tubular body with little or no resistance, and furthermore the friction of the ring seal member will be minimal, so the durability of the ring seal member can be increased.

Furthermore, with the tubular body sealing mechanism corresponding to the present invention according to claim 2, the attaching member can be removed with little or no friction because the ring seal member contracts while moving from the large diameter region of the shaft part to the small diameter region in conjunction with the movement when the attaching member is removed from the opening of the tubular body.

Furthermore, with the tubular body sealing mechanism corresponding to the present invention according to claim 3, the ring seal member is smoothly moved from the small diameter region to the large diameter region or from the large diameter region to the small diameter region.

Furthermore, with the tubular body sealing mechanism corresponding to the present invention according to claim 4, compressed air or the like can be fed into or vented from inside of the tubular body through the hole which passes through the shaft part.

Furthermore, with the tubular body sealing mechanism corresponding to the present invention according to claim 5, a hermetic plug can easily be attached to a fuel delivery pipe injector cap without damaging the ring seal member.

Furthermore, with the tubular body sealing mechanism corresponding to the present invention according to claim 6, an injector can easily be attached to a fuel delivery pipe injector cap without damaging the ring seal member.

DESCRIPTION OF THE PREFERRED EMBODIMENT

Figure 1:
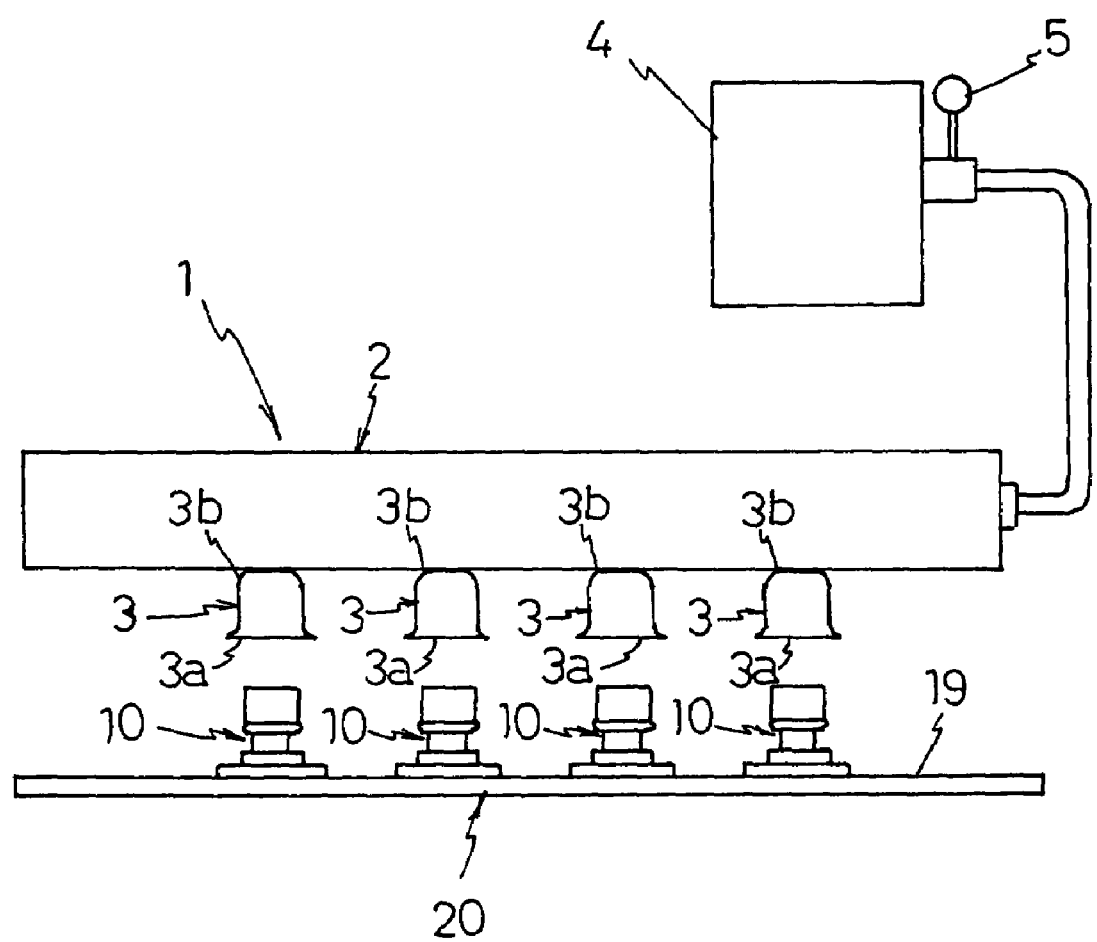
FIG. 1 is a concept diagram showing an example where the tubular body sealing mechanism of the present invention is used as a hermetic plug for performing hermetic seal testing on a fuel delivery pipe, and shows hermetic seal testing apparatus equipped with a hermetic plug as well as a fuel delivery pipe and a hermetic seal tester.

The tubular body sealing mechanism of the present invention will be described below in detail while referring to the drawings.

FIG. 1 is a concept diagram showing an example where the tubular body sealing mechanism of the present invention is used as a hermetic plug for performing hermetic seal testing on a fuel delivery pipe, and shows hermetic seal testing apparatus equipped with a hermetic plug as well as a fuel delivery pipe and a hermetic seal tester. Furthermore, FIG. 2 is a cross section diagram showing the condition prior to attaching the hermetic plug of FIG. 1 to the injector cap of a fuel delivery pipe, and FIG. 3 shows the condition after attaching.

A plurality of injector caps 3 are attached by brazing to a pipe 2 of a fuel delivery pipe 1. This fuel delivery pipe 1 uses a hermetic plug 10 as an injector cap 3 to form a seal, and supplies compressed air of a predetermined pressure from a hermetic seal tester 4 into the pipe 2 while performing hermetic seal testing by measuring the change in the pressure inside the pipe 2 using a pressure gauge 5.

The injector cap 3 has an opening end 3a which opens up like a horn, and a base end which has a reduced diameter region 3b where the diameter is reduced inward in the radial direction. This injector cap 3 supports an injector 21 which will be discussed later and which is inserted from the opening end 3a.

Figure 2:
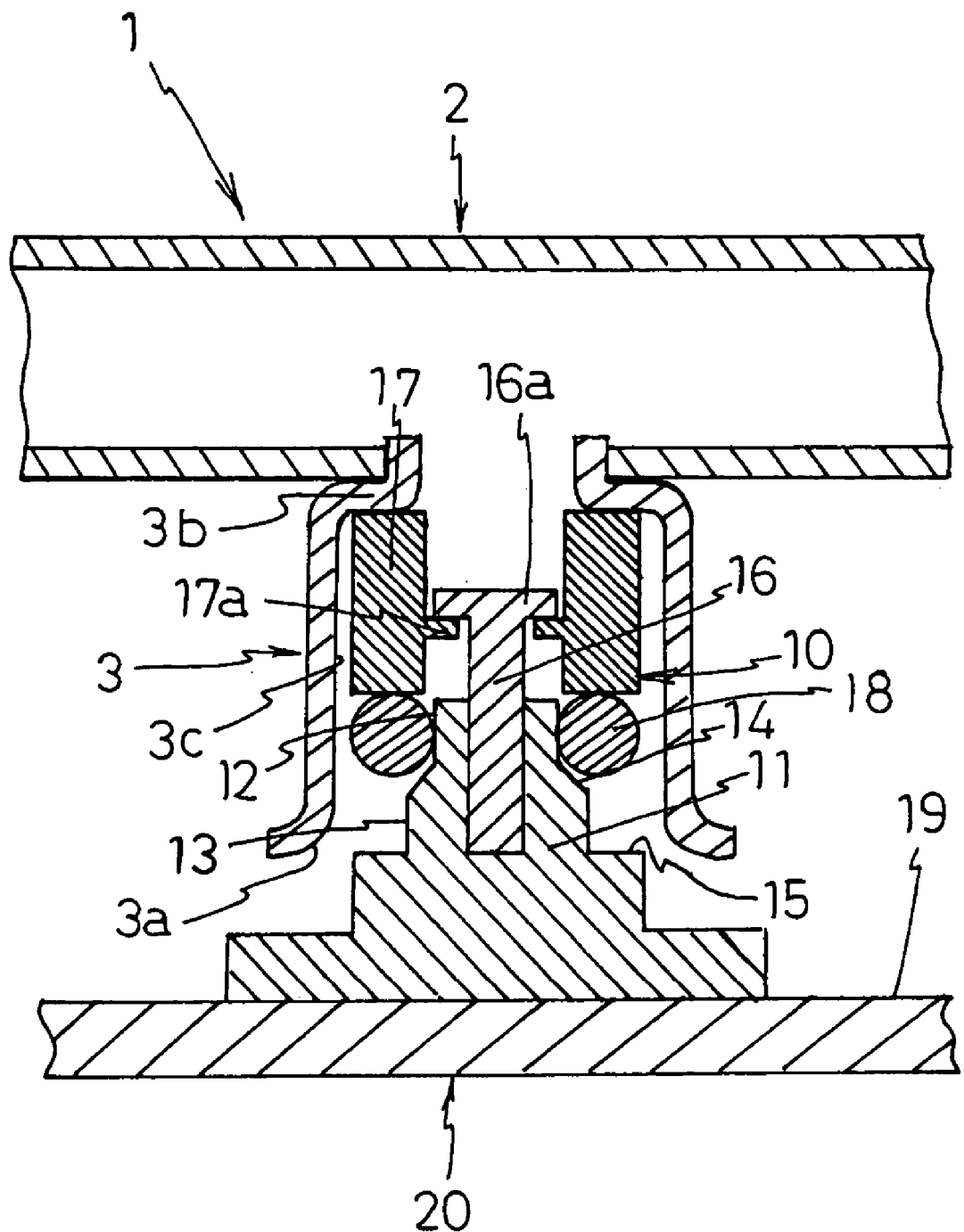
FIG. 2 is a major component cross section diagram showing an example where the tubular body sealing mechanism of the present invention is applied to a hermetic plug for performing hermetic seal testing on a fuel delivery pipe, and shows the condition prior to attaching the injector cap to the hermetic plug.
Figure 3:
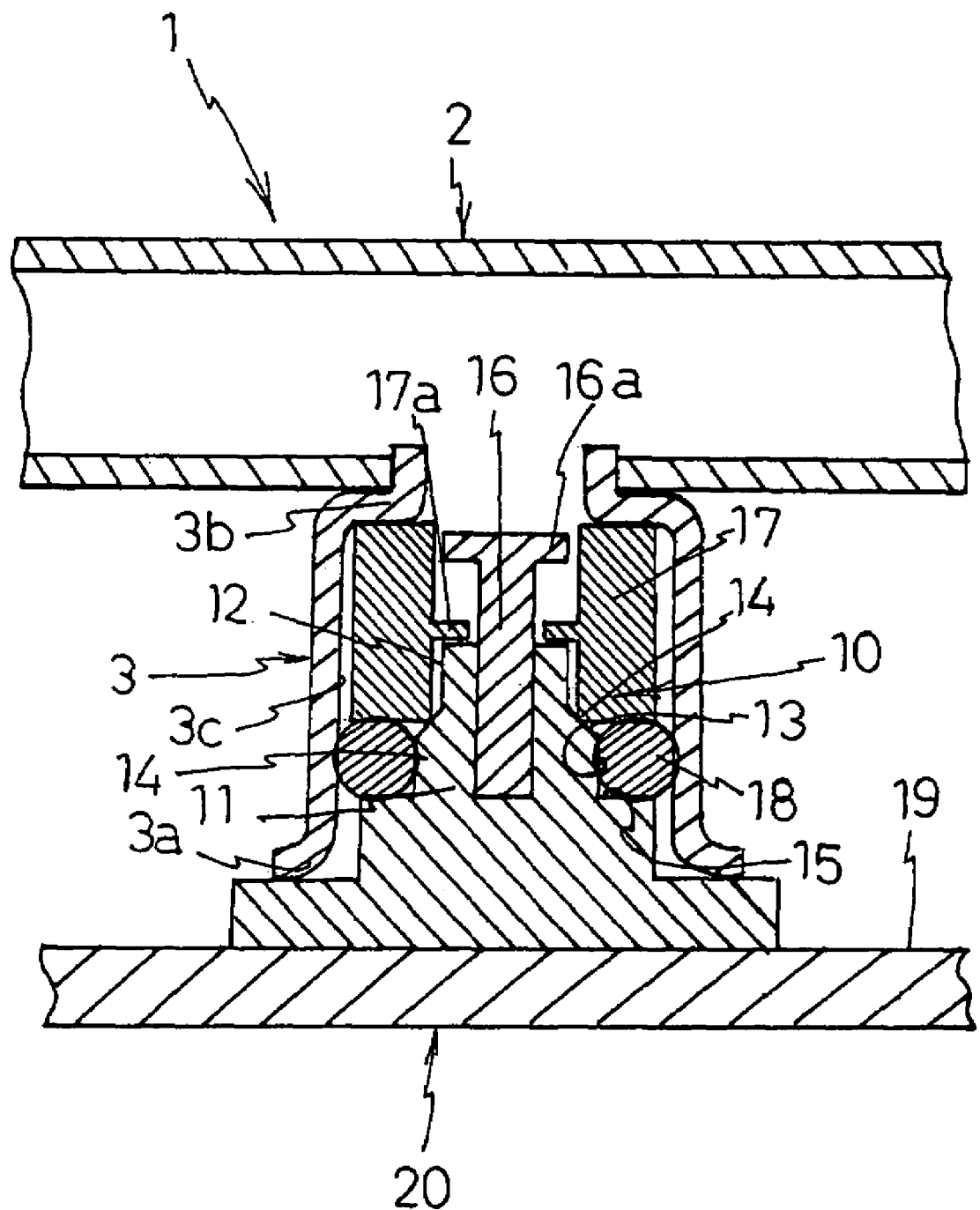
FIG. 3 is a major component cross section diagram showing an example where the tubular body sealing mechanism of the present invention is applied to a hermetic plug for performing hermetic seal testing on a fuel delivery pipe, and shows the condition when the injector cap is attached to the hermetic plug.

The hermetic plug 10 shown in detail in FIG. 2 has a shaft part 11. This shaft part 11 has in order a leading end (upper end in the figure), a small diameter region 12, and a large diameter region 13, and the small diameter region 12 and the large diameter region 13 are connected with a taper region 14. Furthermore, the shaft part 11 has a rim 15 on the back end of the large diameter region 13 (bottom end in figure). Furthermore, a pin 16 with a rim 16a on the leading end is implanted in the leading end surface of the shaft part 11.

Furthermore, the hermetic plug 10 has a bushing 17. This bushing 17 has a flange 17a which protrudes inward towards the center of the hole. Furthermore, this bushing 17 is removably supported in the axial direction of the shaft part 11 because this flange 17a mates with the pin 16, and is prevented from falling from the shaft part 11 by the rim 16a of the pin 16.

Furthermore, the hermetic plug 10 has a ring seal member 18 such as an O-ring. This ring seal member 18 is mated to the small diameter region 12 of the shaft part 11.

Hermetic plugs 10 with this type of construction are mounted on a common base 19 to form an apparatus 20. Furthermore, injector caps 3 of a fuel delivery pipe 1 are sealed by this apparatus 20 as shown below.

First, in the condition shown in FIG. 2, the opening end 3a of the injector caps 3 of the fuel delivery pipe 1 are mated to the shaft part 11 of the hermetic plugs 10, and when the fuel delivery pipe 1 is pressed down further, the reduced diameter region 3b of the injector caps 3 will contact with the leading end of the bushing 17 (upper end in the figure) and push down on the bushing 17. At that time, the ring seal member 18 on the small diameter region 12 of the shaft part 11 will be pressed down by the bushing 17, and as shown in FIG. 3, the ring seal member 18 will expand and move to the large diameter region 13.

Therefore the ring seal member 18 will contact with the inside surface 3c of the injector cap 3, and will create a seal between the shaft part 11 and the injector cap 3.

In the sealed condition, compressed air with a predetermined pressure is applied to the fuel delivery pipe 1, and after a predetermined period of time, the pressure in the fuel delivery pipe 1 is measured using a pressure gauge and the condition of the hermetic seal is confirmed.

When the hermetic seal testing is completed, the fuel delivery pipe 1 is lifted back from the condition of FIG. 3. At this time, the shape dimensions of the inner surface 3c of the injector cap 3, the large diameter region 13 of the shaft part 11, and the ring seal member 18 are designed so that the frictional resistance between the ring seal member 18 and the inner surface 3c of the injector cap 3 is larger than the frictional resistance between the ring seal member 18 and the large diameter region 13 of the shaft part 11, and therefore the ring seal member 18 will move upward along with the fuel delivery pipe 1, the diameter will shrink along the taper surface 14, and when reaching the small diameter region 12 of the shaft part 11 as shown in FIG. 2, will separate from the inner surface 3c of the injector cap 3.

Furthermore, the injector cap 3 of the fuel delivery pipe 1 will completely separate from the hermetic plugs 10, but the flange 17a of the bushing 17 will contact with the rim 16a of the pin 16, so the bushing 17 will be stopped, and the ring seal member 18 will be prevented from separating from the small diameter region 12 of the shaft part 11.

Incidentally, with this embodiment, an example is shown where the hermetic plugs 10 are attached to the apparatus 20 and the injector caps 3 of the fuel delivery pipe 1 are attached to the hermetic plugs 10, but conversely, the injector caps 3 may be attached to the hermetic plugs 10.

Furthermore, with this embodiment, a plurality of hermetic plugs 10 were established on a base 19 to form an apparatus 20, but the hermetic plugs 10 may also be used independently.

Furthermore, with this embodiment, an example is shown where the hermetic plugs 10 are applied to a fuel delivery pipe 1, but the hermetic plugs 10 may also be applied to seal the openings of other tubular bodies.

Figure 4:
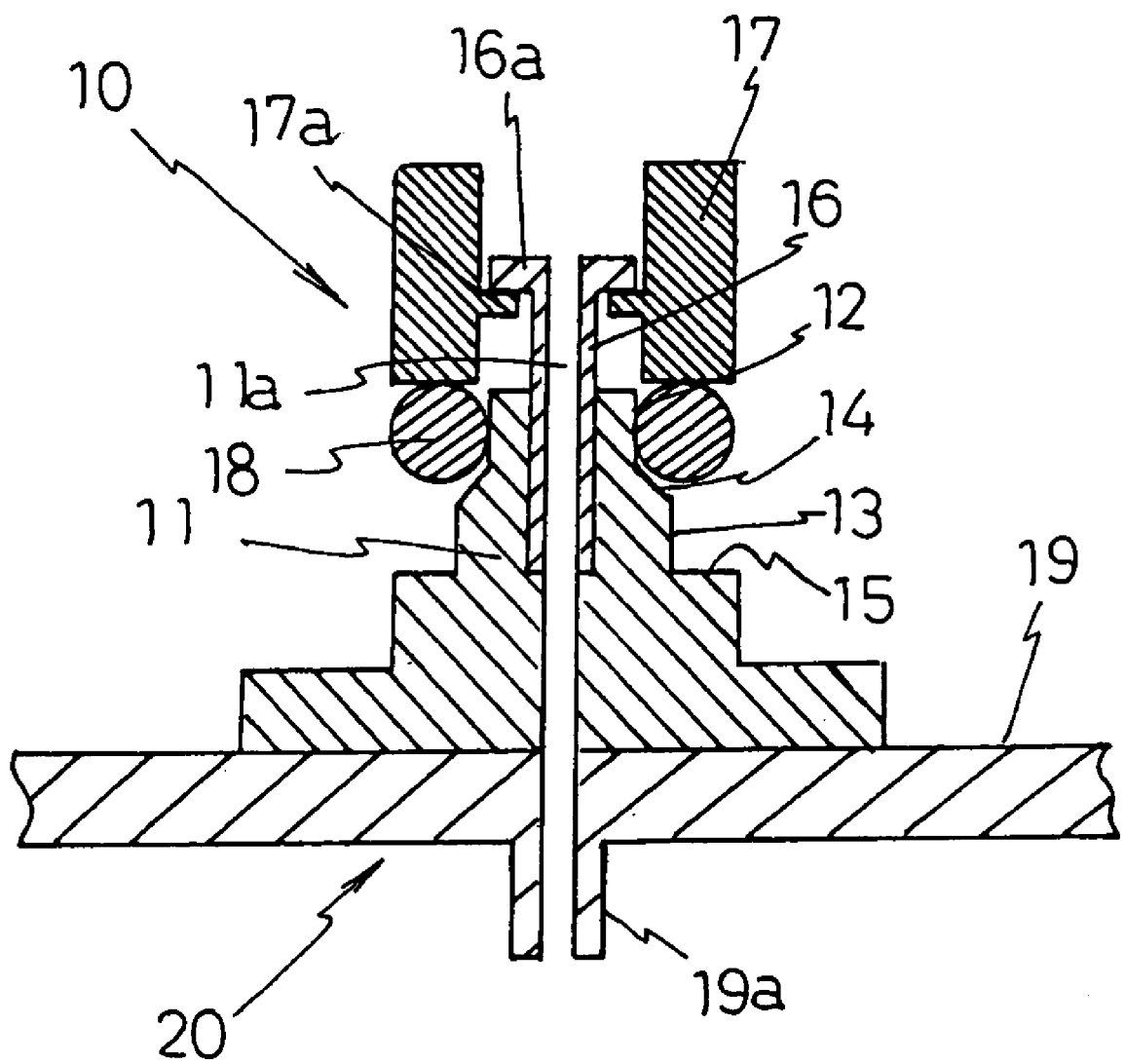
FIG. 4 is a cross section diagram showing an alternate example of the tubular body sealing mechanism of the present invention applied to a hermetic plug for performing hermetic seal testing on a fuel delivery pipe.

Furthermore, as shown in FIG. 4, the hermetic plugs 10 may have an air hole 11a in the center of the shaft part 11 and may also have a joint 19a which connects an air line not shown in the figures to the end of the shaft part 11. This hermetic plug 10 is used to supply compressed air or the like into the tubular body or vent air from the tubular body through the air line and the air hole 11a by attaching the hermetic plug 10 to the opening of the tubular body and connecting the air line to the seam 19a.

Figure 5:
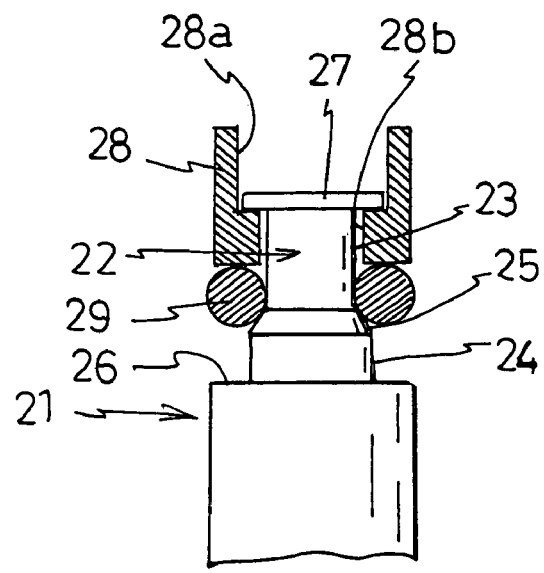
FIG. 5 is a major component cross section diagram showing an injector as another embodiment of the tubular body sealing mechanism of the present invention.
Figure 6:
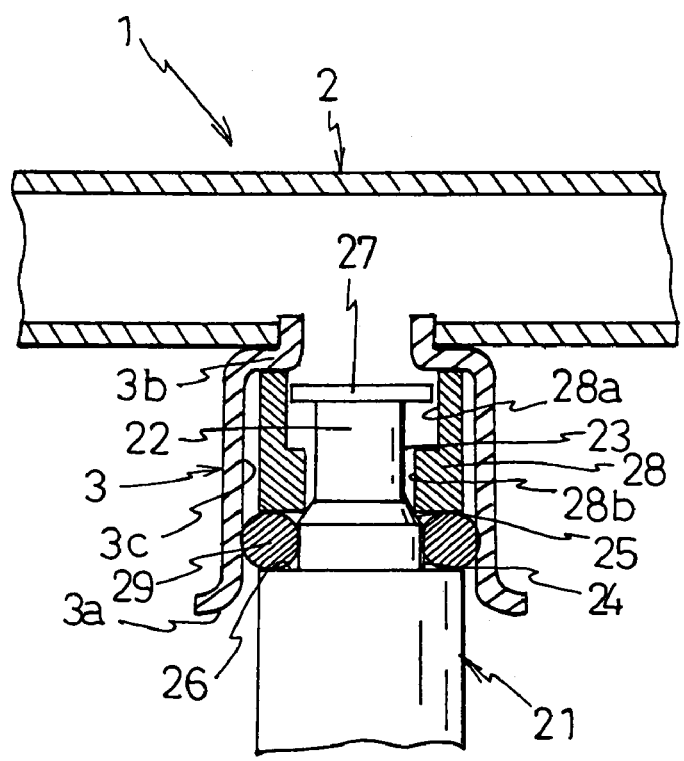
FIG. 6 is a major component cross section diagram showing the injector of FIG. 5 as attached to the injector cap of a fuel delivery pipe.

Furthermore, FIG. 5 and FIG. 6 show examples of another embodiment of the present invention where the sealing mechanism of the present invention is applied to injector caps 3 and injectors 21 of a fuel delivery pipe 2.

The injectors 21 of this embodiment have a shaft part 22 at the end. This shaft part 22 has a small diameter region 23 and a large diameter region 24 in this order from the leading end (upper and in the figure), and the small diameter region 23 and the large diameter region 24 are connected by a tapered surface 25. Furthermore, the shaft part 22 has a rim 26 on the base end (lower end in the figure) of the large diameter region 24. Furthermore, a rim 27 is located on the leading end surface of the shaft part 22.

Furthermore, injector 21 has a bushing 28. This bushing 28 has a large diameter hole 28a on the leading end. Furthermore, this bushing 28 is movably supported in the axial direction with regards to the shaft part 22 because the hole 28b is mated to the shaft part 22, and the bushing 28 is prevented from separating from the shaft part 22 by the rim 27.

Furthermore, the injector 21 has a ring seal member 29 such as an o-ring. Furthermore, the ring seal member 29 is mated to the small diameter region 23 of the shaft part 22.

Injectors 21 with this construction are inserted in and supported by the injector caps 3 of the fuel delivery pipe 1 as shown below.

First, the shaft part 22 of the injector 21 is inserted into the opening end 3a of the injector cap 3 of the fuel delivery pipe 1, and when the injector 21 is pushed in further, the leading end of the bushing 28 will contact with the reduced diameter region 3b of the injector cap 3, and the bushing 28 will be moved down as shown in FIG. 6. At this time, the ring seal member 29 on the small diameter region 23 of the shaft part 22 will be pressed down by the bushing 28, and the ring seal member 29 will be moved to the large diameter region 24 as shown in FIG. 6, and will expand outward.

Therefore, the ring seal member 29 will contact with the inside surface 3c of the injector cap 3, and a seal will be formed between the shaft part 22 and the injector cap 3.

When the injector 21 is removed from the injector cap 3 of the fuel delivery pipe 1, the injector 21 is pulled from the injector cap 3. At this time, the shape dimensions of the inside surface 3c of the injector cap 3, the large diameter region 24 of the shaft part 22, and the ring seal member 29 are designed such that the frictional resistance between the ring seal member 29 and the inside surface 3c of the injector cap 3 is larger than the frictional resistance between the ring seal member 29 and the large diameter region 24 of the shaft part 22, so when stopped in the injector cap 3, the ring seal member 29 will reduce in diameter along the taper surface 14, and when the ring seal member 29 reaches the small diameter region 23 of the shaft part 22, the ring seal member 29 will separate from the inside surface 3c of the injector cap 3.

Furthermore, the injector 21 will completely separate from the injector cap 3 of the fuel delivery pipe 1, but the rim 27 will contact the step at the boundary between the hole 28b and the large diameter hole 28a of the bushing 28, so the bushing 28 will be prevented from separating from the shaft part 22.

Embodiments of a sealing mechanism for a tubular body of the present invention have been described, but the present invention is not restricted to these embodiments in any way, and various alternates and variations may of course be added so long as the scope does not deviate from the essential points of the present invention stated in the patent claims.

What is claimed is:

1. A tubular body sealing mechanism which seals, with a ring seal member that fits onto a shaft part of an attaching member, a space between an opening of the tubular body which has a reduced diameter region at a suitable distance from the opening and the attaching member which is inserted into the opening, wherein
   a bushing is fit onto the leading end of the shaft part to be moveable in the axial direction;
   the ring seal member is fit to be moveable between a base part thereof and the bushing;
   a small diameter region is formed on the end of the shaft part on the bushing side in the ring seal member moveable region,
   a large diameter region is formed on the end of the shaft part on the base part side;
   and when the shaft part of the attaching member is inserted into the tubular body from the opening end of the tubular body, the bushing contacts the reduced diameter region of the tubular body, the bushing moves toward the base part of the shaft, and the ring seal member is moved by the bushing from the small diameter region to the large diameter region, such that the ring seal member deforms and expands toward the inner peripheral face of the opening and the ring seal member forms a press fit to the inner peripheral face of the tubular body to create a hermetic seal.

2. The tubular body sealing mechanism according to claim 1, wherein the shape and dimensions of the inner peripheral face of the tubular body, the large diameter region of the shaft part, and the ring seal member are established such that the frictional resistance between the ring seal member and the inner peripheral face of the tubular body is larger than the frictional resistance between the ring seal member and the large diameter region of the shaft part, when the ring seal member is positioned at the large diameter region of the shaft part.

3. The tubular body sealing mechanism according to claim 1, wherein the small diameter region and the large diameter region of the shaft part are connected by a tapered surface.

4. The tubular body sealing mechanism according to claim 1, wherein a hole is formed to penetrate through the axial core of the attaching member.

5. The tubular body sealing mechanism according to claim 1, wherein the tubular body is an injector cap for a fuel delivery pipe, and the attaching member is a hermetic plug used for a hermetic seal test.

6. The tubular body sealing mechanism according to claim 1, wherein the tubular body is an injector cap for a fuel delivery pipe, and the attaching member is an injector.

* * * * *